United States Patent Office 3,337,450
Patented Aug. 22, 1967

3,337,450
DOMESTIC EFFLUENT WATER PURIFICATION PROCESS
Max Dubach, Riedholz, Switzerland, assignor to Cellulosefabrik Attisholz A.-G. vorm. Dr. B. Sieber, Attisholz, Switzerland
No Drawing. Filed Mar. 4, 1965, Ser. No. 437,284
Claims priority, application Switzerland, Mar. 10, 1964, 3,073/64
11 Claims. (Cl. 210—16)

The biological purification of domestic effluent water according to the so-called activated sludge process normally is conducted in a continuous operation in which a preliminary mechanical purification is effected in a sedimentary tank to remove the coarse suspended solids from the effluent water. The effluent water thus prepurified is fed into an aerating tank for biological purification. In the aerating tank the effluent water to be purified is aerated in the presence of a certain amount, e.g. 3000 milligrams per liter (mg./l.) of micro- and macro-organisms for brevity referred to as biological or activated sludge. The aeration is effected for extended periods, e.g. two hours. Due to the activity of the bacteria the organic impurities present in the effluent water are assimilated and decomposed and, at the same time, the bacteria multiply very strongly. The added bacteria now must be removed by means of the macro-organisms, notably the bacteriophagic protozoae, since the bacteria otherwise could be removed only with difficulties due to their lack of sedimentability. The effluent water then is fed to a secondary purification tank in which the sludge is sedimented from the water. The effluent water thus purified and sedimented leaves the secondary purification tank as biologically purified water. A part of the activated sludge sedimented in the secondary purification tank is recirculated for maintaining the desired sludge concentration in the aerating tank. The other part of the sludge is withdrawn and constitutes the sludge surplus.

A serious disadvantage of this process consists in the fact that two antagonistic processes must be carried out in the aerating tank. On the one hand, a sufficient quantity of bacteria should be present at any time even when the domestic effluents are produced in greater amounts and the organic impurities present in the effluent water should be decomposed without regard to fluctuations of the amount of effluent. On the other hand, sufficient bacteriophagic organisms should be present at any time in order to remove the surplus bacteria from the effluent water. The efficiency of the plant is decreased in both cases, i.e. with a bacteria surplus as well as with a surplus of bacteriophagae.

A bacteria surplus leads to difficulties in the secondary purification or sedimentation tank. With a surplus of bacteriophagae the quantity of bacteria is not sufficient for decomposition of the organic impurities. The known plants, therefore, are working at full efficiency only if a certain equilibrium between the two groups of organisms is maintained. It is extremely difficult to maintain this equilibrium and to ascertain that neither the aerating tank nor the sedimentation tank lacks oxygen (which would lead to a decay of the protozoae) and to compensate the normal quantitative fluctuations of the effluent water to be purified. An added difficulty stems from the fact that the life conditions of the two groups of organisms are markedly different. While the bacteria necessary for decomposition of the organic impurities in the effluent water have an optimum effect mainly at very low oxygen concentrations, the bacteriophagic protozoae cannot exist in such an environment. The said protozoae, however, multiply considerably in an effluent water rich in oxygen where the bacteria due to the strong development of the protozoae cannot develop their full activity. Correspondingly, the purification plants operating according to the above described process are very sensitive to fluctuations of the through-put and have, correspondingly, fluctuating degrees of their efficiency of purification.

A further grave disadvantage of the said known process is based on the fact that in order to achieve a sufficient decomposition, i.e. a decomposition of about 90% of the organic impurities in the effluent water 1.5 kg. oxygen per each kilogram of decomposed B.O.D. must be introduced into the aerating tank. The term "B.O.D." or the biological oxygen required represents that amount of oxygen which is consumed by the mirco-organisms for decomposition of the organic impurities in a given effluent water within five days. The B.O.D. value is commonly used to express the amount of decomposable substance in an effluent water and this term is used herein in this sense. The high oxygen consumption of the known process correspondingly leads to a high energy consumption per kilogram of decomposed B.O.D. since large quantities of air must be introduced into the aerating tank. Consequently, the operating costs are high.

It is a primary object of this invention to provide for a biological purification process on the basis of activated sludge which process does not have the disadvantages discussed above, and which affords an increased economy of operation.

Other objects will become apparent as the description proceeds.

According to a first aspect of the invention, these and other objects are achieved in a biological purification process of domestic effluent waters according to the activated sludge method by the fact that the step of decomposing the impurities by bacteria, on the one hand, and the step of removing the surplus bacteria by bacteriophagic organisms, on the other hand, are effected in two entirely separated biological process stages.

In the process of the invention the life conditions for the organisms in the first process stage are selected such that the bacteria can develop their full efficiency and are present in a sufficient amount at any time to decompose the impurities in the effluent water, even if the latter is processed in fluctuating amounts. The second process stage, on the other hand, is operated such that the bacteriophagic organisms, preferably protozoae, can develop in preference thus safety removing the bacteria in the effluent water from the first process steps. The necessary organisms, therefore, are present in a sufficient amount for both process steps at any time.

In an important embodiment of the process according to the invention a prepurified or untreated effluent water is continuously fed into the aerating tank of the first stage and then into the corresponding subsequent or downstream sedimenting tank. The life conditions in the aerating tank are controlled such that the bacteria but not the bacteriophagic organisms can freely develop. This is effected by controlling the aerating time, the oxygen amount introduced by the air, and the sludge concentration such that 0.1–5.0 milligrams, preferably 0.1–2.0 milligrams of free oxygen can be found per liter of effluent water. The conditions are controlled such that the partially purified effluent water in the subsequent sedimenting tank does not contain any free oxygen. Due to this latter measure any bacteriophagic organisms introduced by chance via the effluent water to be treated are handicapped in their development to such an extent that they do not hinder the full development of the activity of the bacteria in the first process stage. The aerating time is controlled by means of the effluent water feed to, and the capacity of, the aerating tank. The oxygen content is controlled by means of the amount of air added. The sludge concentration is controlled by the rate of recirculation of the organisms sedimented in the sedimenting tank; these organisms contain few, if any, protozoae.

The effluent water flowing from the sedimenting tank predominantly contains that part of the bacteria which cannot be sedimented and is fed now into the aerating tank of the second stage and subsequently into the corresponding sedimenting tank. The life conditions in this second aerating tank are controlled such that the bacteriophagic organisms find optimum conditions, and develop freely. This is effected by controlling the aerating time, the amount of oxygen introduced, and the sludge concentration such that at least 4 milligrams, preferably more than 5 milligrams of free oxygen are found per liter of effluent water. These conditions also are controlled such that the fully purified effluent water from the subsequent sedimenting tank still contains at least 2 milligrams oxygen per liter and preferably at least 4 milligrams of oxygen per liter. In the entire second process stage the environment at any time contains a considerable amount of oxygen and the bacteriophagic organisms can develop their full activity.

The above described separation of the biological purification process into two entirely separated stages operating under entirely different conditions provides for a more complete operation of the purification process, and a considerably decreased sensibility against fluctuations in the operation, if compared with the well-known activated sludge process operating in a single stage. In addition, a better then 90% elimination of the B.O.D. can be achieved with an oxygen consumption of only 0.6–0.8 kg. oxygen per kilogram of B.O.D. This, of course, leads to a substantial saving in operation costs.

The following example is given for purposes of illustration not of limitation:

A domestic effluent water is purified in a total amount of 500 cubic meters per day and contains an average amount of B.O.D. of 200 milligrams per liter; the amount of effluent water to be purified is subject to strong fluctuations and enters the plant in an amount of up to 40 cubic meters per hour during day time, and down to 10 cubic meters per hour during the night.

The effluent water is continuously and directly, i.e. without preliminary purification, fed into an aerating tank having a capacity of 20 cubic meters so that the residence time of the effluent water during day time is about 30 minutes, and about 2 hours during the night. The sludge concentration is controlled to 4000–6000 milligrams dry sludge substance per liter by recirculation of sludge from the subsequent sedimentation tank with a pump. Air is introduced into the aerating tank 4 meters below the surface in an amount of 50 cubic meters per hour. An oxygen content of about 2 milligrams per liter is obtained in the aerating tank. The water flowing continuously from the aerating tank after this treatment is fed into the corresponding sedimenting tank. The sedimenting tank has a capacity or volume of about 100 cubic meters and is arranged in such a manner known per se that the sedimented portion of the biological sludge can be collected at a predetermined area in a concentration of about 20,000 milligrams dry sludge substance per liter so that it can be recirculated to maintain the desired sludge concentration in the aerating tank. The purified effluent water from the sedimenting tank of the first process step does not contain free oxygen and the sedimented sludge therefore is substantially free from bacteriophagic protozoae. The water now is fed into the aerating tank of the second process stage which tank also has a capacity of 20 cubic meters. Again, 50 cubic meters of air are introduced into the aerating tank per hour in the same manner as in the first aerating stage. The sludge concentration, however, is now controlled in the range between 300 and 500 milligrams per liter. The oxygen content of the effluent water is about 5 milligrams per liter. The effluent water from the aerating tank of the second process stage is continuously fed into the sedimenting tank of the second process stage. This sedimenting tank again has a volume of 100 cubic meters and is arranged in the same manner as the sedimenting tank of the first process stage. Again, the sedimented sludge is recirculated to maintain the desired sludge concentration in the aerating tank, however referring now to the second tank. The effluent water from the second sedimenting tank is absolutely clear and has an oxygen content of at least 4 milligrams per liter. The B.O.D. concentration in the effluent is about 10 milligrams per liter corresponding to a B.O.D.-elimination or total water purification of 95%. For maintaining the desired sludge concentration the sludge surplus caused by the microorganisms during their decomposition of organic matter must be withdrawn from time to time.

While some preferred embodiments of the invention have been described above in detail, it is to be distinctly understood that the invention is not limited thereto but may be otherwise variously embodied and practiced within the scope of the following claims.

I claim:

1. A process for the microbiological purification of domestic effluent water by means of an activated sludge system which comprises:
    (a) decomposing organic impurities in said water in a first aerating stage by means of bacteria while maintaining optimum life conditions for the bacteria by maintaining a relatively low oxygen content;
    (b) conveying the thus treated water to a first sedimentation stage for sedimentation of bacteria sludge;
    (c) thereafter conveying the water to a second separate aerating stage in substantially oxygen free condition for destruction of bacteria in said water by means of bacteriophagic organisms while maintaining optimum life conditions for said bacteriophagic organisms in said second aerating stage by maintaining a relatively high oxygen content, and
    (d) conveying the thus treated water to a second sedimentation stage, whereby biolgoically purified water is obtained.

2. A process as claimed in claim 1, wherein said first and second aerating stages and first and second sedimentation stages are performed in separate vessels, said process being carried out continuously by consecutively conveying the water through said vessels.

3. A process as claimed in claim 1, wherein said effluent water is mechanically purified prior to the biological purification.

4. A process as claimed in claim 1, wherein the life conditions maintained in said first aerating and sedimentation stage are such that the bacteria, but not the bacteriophagic organisms, can develop.

5. A process as claimed in claim 1, wherein the aerating time, the oxygen amount introduced by aeration, and the concentration of the activated sludge are controlled such that a concentration of from 0.1–5.0 milligrams of free oxygen per liter of water is obtained in said first aerating stage.

6. A process as claimed in claim 5, wherein the said oxygen concentration is maintained at 0.1–2.0 milligrams free oxygen per liter of water.

7. A process as claimed in claim 5, wherein the said oxygen concentration in said first aerating stage is controlled such that the purified effluent water emanating from said first sedimentation stage after a predetermined residence time does not contain any free oxygen thus forming an environment in which the bacteriphagic organisms cannot exist.

8. A process as claimed in claim 1, wherein the aerating time, the oxygen amount introduced, and the sludge concentration in the second aerating stage are controlled such that a free oxygen content of at least 4 milligrams per liter is obtained.

9. A process as claimed in claim 8, wherein the said oxygen content is maintained at a level of above 5 milligrams per liter.

10. A process as claimed in claim 8, wherein the free oxygen concentration in the second aerating stage is selected such that the purified effluent water from the second sedimentation stage after a predetermined residence time contains at least 2 milligrams of free oxygen per liter.

11. A process as claimed in claim 10, wherein said free oxygen concentration is at least 4 milligrams per liter.

References Cited

Simpson, R. W.: Activated Sludge Modification, Water and Sewage Works, October 1959, vol. 106, pp. 421–426.

Isaac, P. C.: Waste Treatment, 1960, Pergamon Press, New York, pp. 56–60, 62, 70–71 and 92–98.

MORRIS O. WOLK, *Primary Examiner.*

MICHAEL E. ROGERS, *Examiner.*